Aug. 4, 1942.　　　　A. L. JACKSON　　　　2,291,809
APPARATUS FOR SLICING, DICING, AND CUTTING MEAT AND THE LIKE
Filed June 19, 1939　　　　4 Sheets-Sheet 4
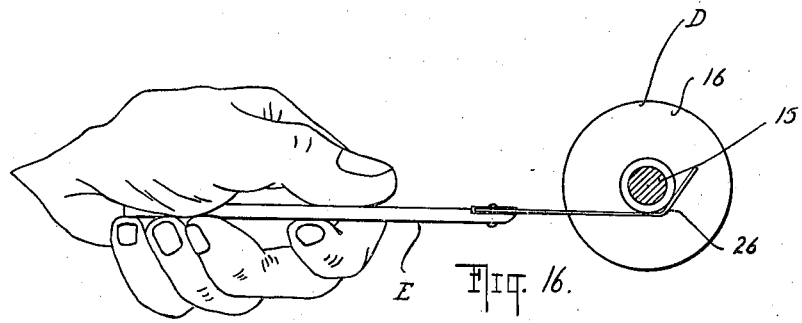
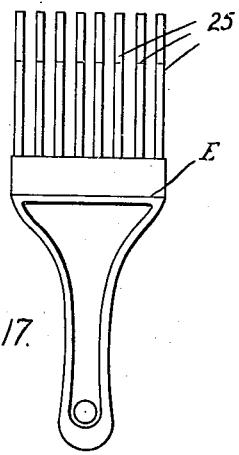
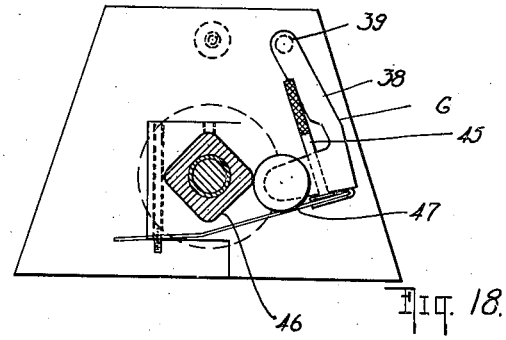
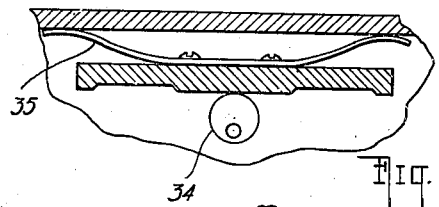
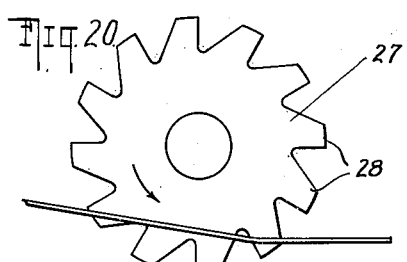
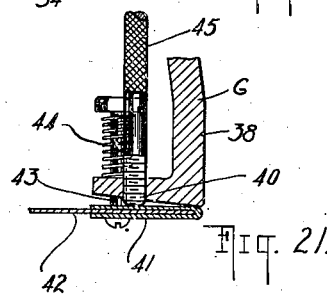
Inventor
ALDRICH L. JACKSON
By Howard L. Fischer
Attorney Patented Aug. 4, 1942

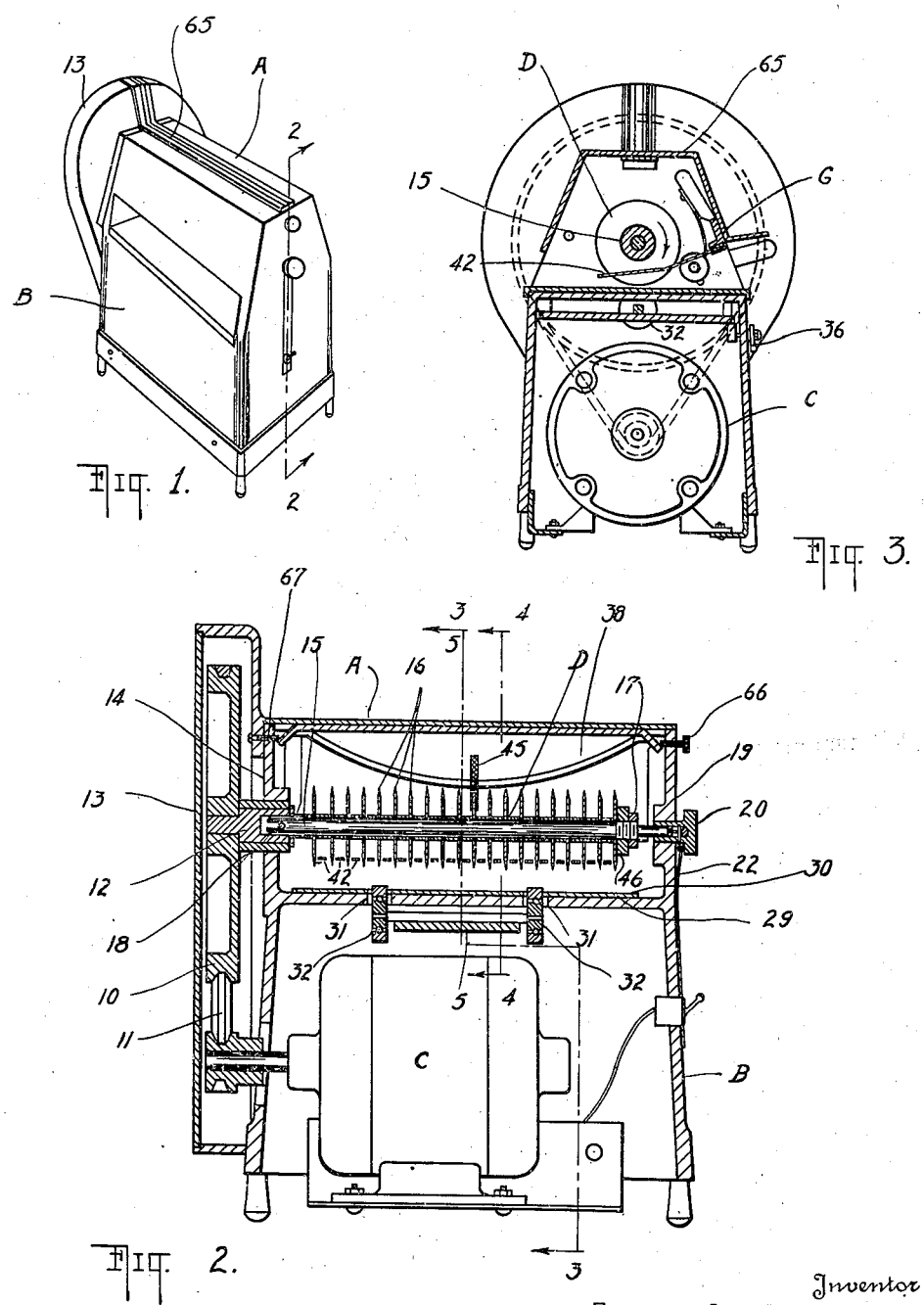

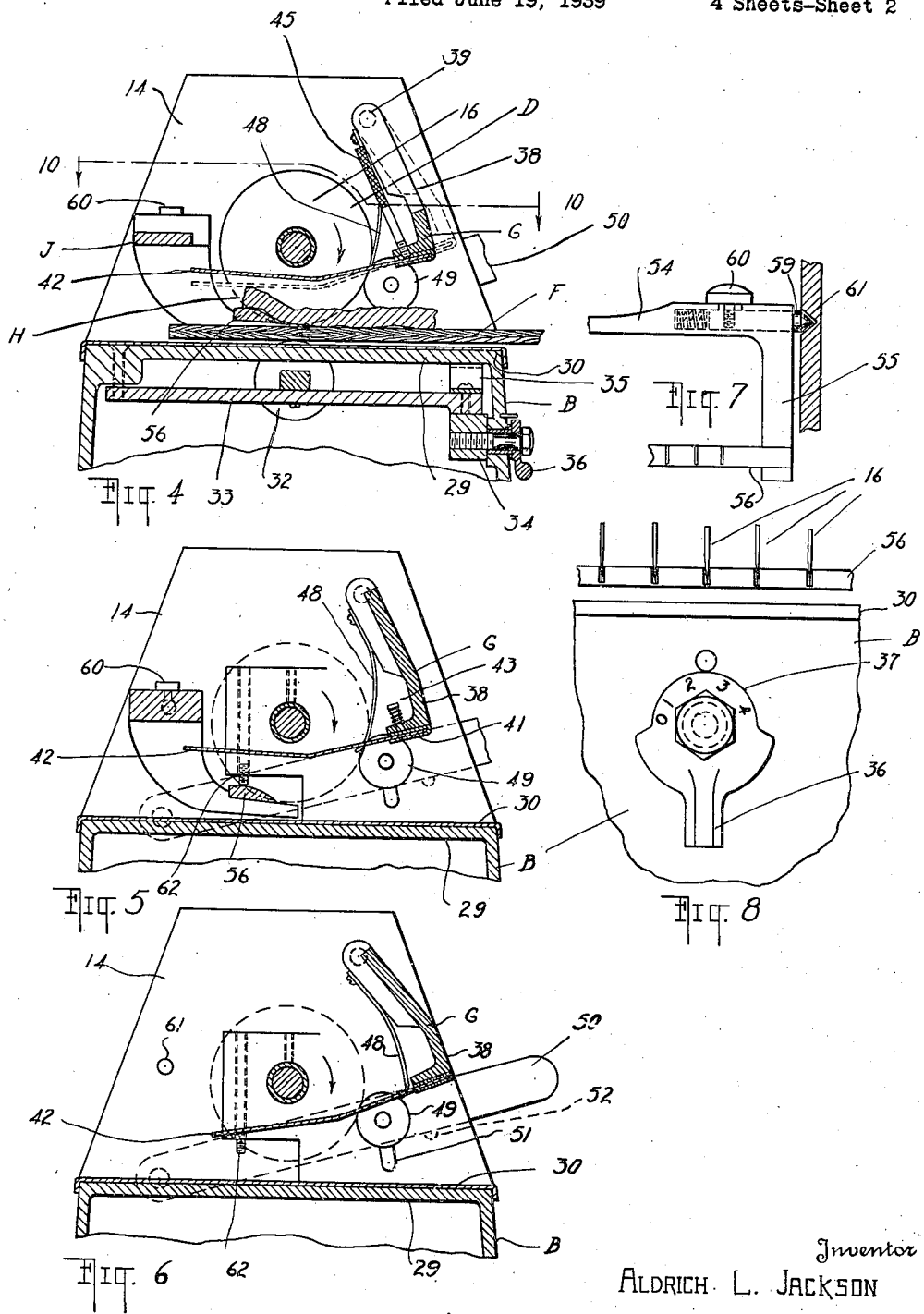

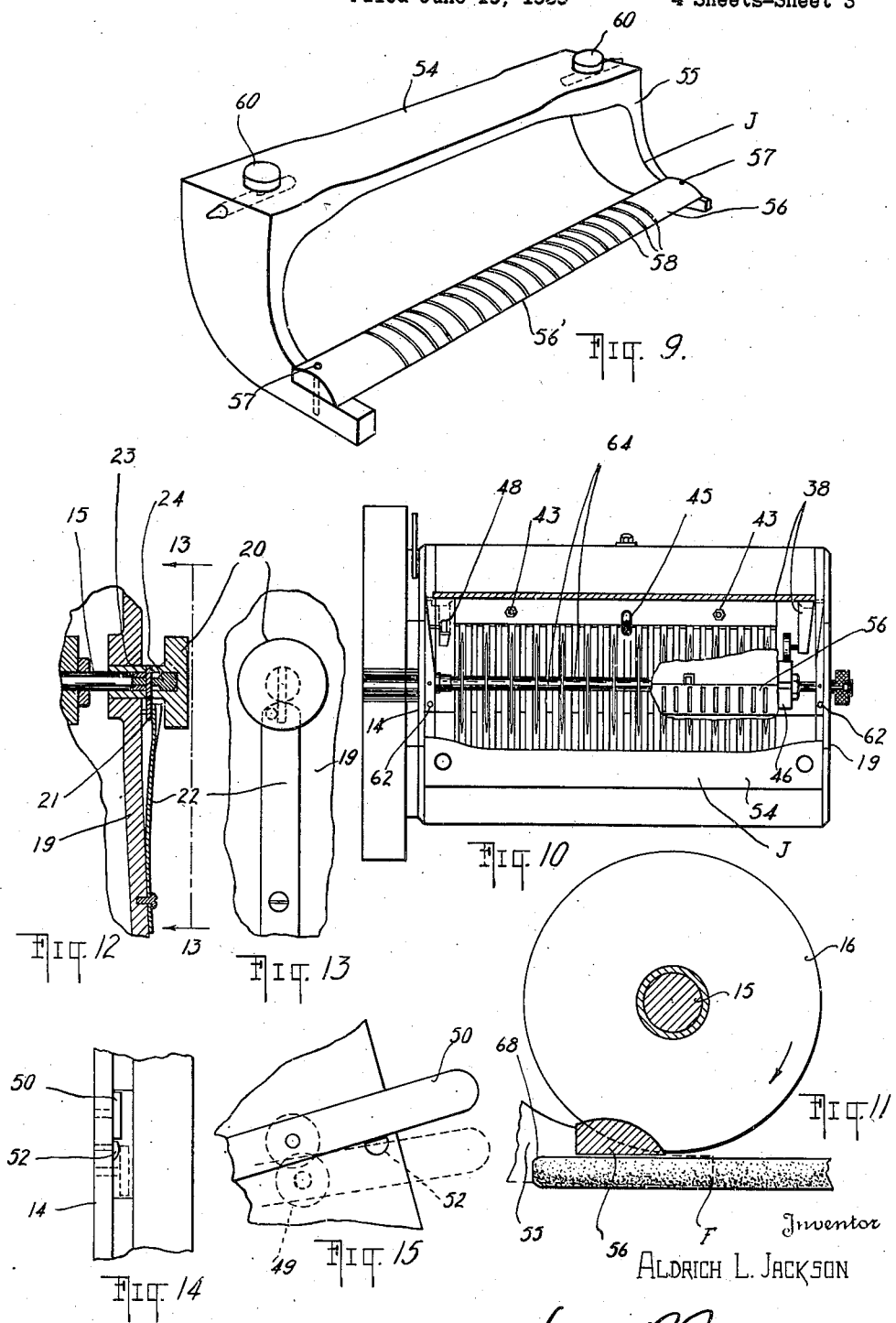

2,291,809

UNITED STATES PATENT OFFICE 2,291,809

APPARATUS FOR SLICING, DICING, AND CUTTING MEAT AND THE LIKE

Aldrich L. Jackson, Minneapolis, Minn.

Application June 19, 1939, Serial No. 279,974

12 Claims. (Cl. 146—98)

My invention relates to the method of dicing, stitching, tenderizing and chopping meat for chop suey, stews, soups, etc., and electrically operated apparatus for accomplishing the same in a simple and easy manner. Meat which may be used in chop suey, stews, soups and the like, while of a good character, is often difficult to cut into uniform, cleanly separated individual cubes due to the nature of the meat being abundant with sinews, sticky, rubber-like tissues, and fibres. My method which employs apparatus electrically operated, accomplishes this work speedily and insures positive, uniform, clean-cut individual cubes. My apparatus includes the slotted shearing bar in conjunction with disc blades and vibrating stripper means.

My vibrating strippers are essential due to the sticky nature of the skin-like tissues of the meat which causes the individual cubes to cling to the blades and strippers, clogging the machine. By my method, I provide the oscillation of the strippers which shakes the cubes and particles of meat off of the strippers as the meat is stripped from the blades onto the endless chute or feed plate.

By reason of the desirability of making these meat cubes in various sizes, I provide a construction for quick changing of the cutting disc roller assemblies, so that the disc cutting blade unit may be quickly changed and wherein the cutting discs of one unit may be spaced apart from each other a different distance than the cutting discs of another unit.

A feature resides in providing a unit of disc cutting knives wherein the disc blades are spaced in a manner to mesh into each slot of the shearing bar with the fingers of the stripper assembly extending between each blade. This cutting disc unit is designed to cut the smallest size cubes, whereas a cutter disc unit wherein the disc cutter blades mesh into every other slot of the shearing bar and the stripper finger assembly, is adapted to provide larger cubes. Further, a disc cutter unit fitting into every third slot, will cut still larger cubes. Other unit cutters with the blades spaced farther apart may be employed to cut even larger cubes if it is desired. In this manner, my machine is very flexible and may be quickly adjusted to cut the desired size cubes.

I provide a lifting and carrying handle with spring fingers which fit between the disc cutter blades so as to engage under the shaft supporting the blades, and by releasing the end of the shaft of the disc cutter blade unit, the lifting and carrying handle provides an easy and safe means of handling the cutter disc units for placing them in the machine or removing them from the same.

The shearing bar of my apparatus may be easily removed, which allows the use of a special toothed disc blade cutting unit to be set in place in the machine. By using this toothed blade cutting unit, steaks or cuts of meat may be knit or stitched together by running the same through my machine, and this permits different kinds of meat to be stitched together into a steak unit. Further, in the stitching operation or method which may be accomplished by the machine I employ in carrying out my method, one or more pieces of meat may be placed on a feeding plate and entered under the toothed disc cutting unit, the teeth of the cutting blades perforating the meat all the way through, tending to tenderize the same by cutting all of the tough fibres and at the same time flattening the cut of meat into steak form. Thus the operation may be repeated by placing two of these flattened pieces of meat on top of each other, thereby stitching the two pieces together to form a one-piece tenderized combination steak of two or more kinds of meat.

Where the apparatus is formed with a slanted table, the meat may be dropped into the slot between the table and the toothed cutting blades to accomplish the same results hereinbefore set forth.

Another feature of my machine is the making of chopped meat more palatable than heretofore when the meat was run through a grinder. By my method and apparatus the meat may be sheared into the desired texture or fine particles by repeating the operation of passing the meat under the shearing cutting disc units and using the closely spaced cutting disc blade unit. Former conventional types of meat grinders had a tendency to crush the juice out of the meat, thereby impairing the flavor, and by my method I have overcome this undesirable crushing of the meat.

My apparatus may also be employed to dice steak with the slits in the same cut at right angles to each other and leaving a thin uncut bottom film of meat on the lower side of the same, it being only necessary to remove the shearing bar on my machine. The machine is provided with means for adjusting the distance between the feed plate or table and the disc cutter blades of the units to leave an uncut film on one side of the steak, and while I have accomplished this heretofore by prior methods and machines I have used, the flexibility of my present apparatus also permits me to accomplish this same result on this apparatus.

A further feature of my apparatus resides in an adjustable pressure or tilting of the stripper fingers of the stripper assembly. Also, the means of vibrating or oscillating the stripper assembly and pivoting the stripper assembly in a manner so that it may be easily released to swing outwardly for cleaning.

Further, the quick-change feature, whereby the cutter disc assemblies may be removed or inserted which also permits the blade assemblies to be easily cleaned, makes a more sanitary apparatus and permits the blade assemblies to be easily sterilized if desired, to thoroughly clean the same.

The easily removable shearing bar assembly also adds to the feature of sanitation and cleanliness that is necessary and desirable in a machine for cutting raw meat.

A still further feature resides in a roller track means for reducing the friction as well as providing adjustment of the feed plate in relation to the shearing bar and lower edges of the cutting blades. This adjustment regulates the depth of cut made by the cutter discs and permits the pallet holding the meat to slide easily rather than retarding the same.

I also provide a lever means to release the pivoted stripper assembly mounting spring which permits the pivoted stripper assembly to be rotated out into cleaning position. This lever means also releases the stripper assembly from the vibrating cam or holds the stripper assembly to set the same in vibrating position.

A further feature resides in the removable stainless steel or other material bed plate, which extends over the entire working bed of the machine beneath the cutters. This removable plate makes it easy for the operator to keep my machine clean and sanitary.

A further feature resides in providing a means for supporting the working shaft which carries the knives to hold the same under spring tension in operative position, yet being releasable so that the same can be quickly and readily removed.

These features, together with the accessibility and easy removability of all the parts that require cleaning, are outstanding and important features of my apparatus used in carrying out my method, which will be more fully and clearly hereinafter set forth.

In the drawings forming part of my specification:

Figure 1 is a perspective of the machine used in carrying out my method, which is adapted to slice, dice, cut and stitch meat.

Figure 2 is a section on the line 2—2 of Figure 1.

Figure 3 is a section on the line 3—3 of Figure 2.

Figure 4 is an enlarged sectional detail on the line 4—4 of Figure 2.

Figure 5 is an enlarged sectional detail approximately on the line 5—5 of Figure 2.

Figure 6 is a section similar to Figure 5, with some of the parts removed and other of the parts in a different position.

Figure 7 is a detail, showing one end of the locking means for the shearing bridge bar frame.

Figure 8 is a detail of the cam lever which adjusts the track over which the pallet rides on the table of the machine.

Figure 9 is a perspective view of the removable shearing bridge bar.

Figure 10 is a detailed section looking down toward the bed or work table of the machine on the line 10—10 of Figure 4.

Figure 11 is an enlarged diagrammatic detail, partially in section, of the shaft supporting the cutter disc knife and the shearing bridge bar with a portion of the meat supporting pallet, showing the relation of these parts in operation.

Figure 12 is a detailed section of the knob and spring means which holds the ends of the shaft which supports the cutter discs in operative position.

Figure 13 is a detail on the line 13—13 of Figure 12.

Figure 14 is an edge detail view of the shouldered rivet for locking the lever which holds the spring stripper assembly in or out of oscillating position.

Figure 15 is a diagrammatic detail, showing the lever illustrated in Figure 14 in the other direction, and illustrating a dotted position of the same.

Figure 16 illustrates the manner in which the hand lifter operates to carry the knife unit and supporting shaft, the shaft being illustrated in section.

Figure 17 illustrates another view of the hand lifter for the knife blade assembly, not illustrated.

Figure 18 is a detail partly in section, showing the cam and associated contacting wheel and frame which oscillates the spring stripper assembly.

Figure 19 is a section detail of the spring which adjusts the frame of the track assembly.

Figure 20 is a diagrammatic detail of the stitcher blade, showing its relative position to a finger of the spring finger stripper assembly.

Figure 21 is an enlarged section detail of a portion of the supporting frame and of the spring finger stripper assembly, showing one of the springs and bolt means which support the stripper assembly to its supporting frame.

Figure 22 illustrates a non-metallic, smooth-faced pallet used in my method and with the apparatus for carrying out the same.

In carrying out my method, I use the apparatus in the machine A which is provided with a base portion B in which an electric motor C is positioned. The electric motor C is adapted to operate the pulley 10 through the belt 11 to drive the main stub shaft 12. The driving means from the motor C is covered by the guard 13.

The stub shaft 12 is anchored in one of the upright portions 14 of the frame, extending up from the base B, and is adapted to drive the shaft 15 upon which the cutter blade discs 16 are mounted. The blades 16 are spaced apart and are clamped together on the shaft 15 by the locking nuts 17. The shaft 15 with the blades 16 form the cutter assembly of the machine A and this assembly may be changed by releasing the shaft 15.

The stub shaft 12 is provided with a pin or key 18 which engages in the bifurcated end of the shaft 15 so as to form a driving connection between the shaft 12 and the shaft 15. The other end of the shaft 15 is supported in the upright portion 19 extending up from the base B by means of the removable knob 20. The knob 20 is more clearly illustrated in Figures 12 and 13 and is provided with a locking pin 21 which engages under the free end of the spring 22 as illustrated in Figure 12 when the knob 20 is in position to hold the end of the shaft operatively in place in the machine A. The end of the shaft 15 extending into the knob 20 is rounded and is adapted to engage against a fibre washer 23 which is provided with a hole through which an oil wick extends so as to lubricate the end of the shaft from the oil well portion 24 formed in the knob 20. By rotating the knob in a counter-clockwise motion it is released from the spring 19 and may be drawn away from the end of the shaft 15, whereupon the knife blade assembly D with the knives 16 may be engaged by the carrier E, as illustrated in Figures 16 and 17. The carrier E is provided with spaced apart fingers 25 which engage between the disc knives 16 and the fingers 25 being bent at 26 provide a recess along the fingers which permits the operator to easily lift the knife blade assembly D out of the machine A and replace it with a new cutter assembly or a different form of cutter assembly, as well as a stitcher blade assembly which uses knives such as 27 having teeth 28.

The machine A is provided with a working bed 29 upon which I lay a removable stainless steel plate which covers virtually the entire working bed and provides a means of sanitation over the bed 29. The stainless plate 30 is readily removable for cleaning at any time. The bed 29 is formed with openings 31 beneath the blade assembly D, through which the adjustable track rollers 32, which are carried by the track assembly 33, are adapted to extend and on which the pallet F is adapted to ride.

The track assembly 33 is adjustable by means of the cam 34 which operates against the free end of the track and against the action of the spring 35 illustrated in Figures 4 and 19, so that the wheels 32 may be raised or lowered, thus raising or lowering the pallet F in relation to the knives 16 of the knife assembly D. I provide operating lever 36 position on the outside of the base B as illustrated in Figures 4 and 8, which is adapted to operate the cam 34. This lever 36 has a marked dial portion 37 to indicate the position of the cam for regulating the relation of the pallet to the cutting knives of the assembly D. The rollers 33 permit the pallet F to slide over the working plate 30 more freely and reduce the friction of the pallet F over the plate 30 and under the knife assembly D.

The machine A is provided with a spring stripper assembly G which includes the frame member 38 pivoted at 39 in the side portions 14 and 19 of the frame of the machine A. The bottom of the frame portion 38 is provided with a flat surface 40 as illustrated in Figure 21 and in Figures 4, 5 and 6, against which the clamping plate 41 which supports the rear ends of the spring fingers 42 of the assembly G engages and is held adjustable into different positions. The clamping plate 41 supports the rear ends of the fingers 42 to hold the same collectively and with the free ends of the spring fingers 42 extending between the knives 16 and positioned to act in a manner to form stripper means for the knives of the assembly D to keep the meat being cut by the knives from wrapping around the knives in the operation of the machine A. The fingers 42 are sufficiently long to extend beyond the knives 16, thereby acting to clean the knives in an effective manner during the rotation of the same.

The plate 41 supporting the spring fingers 42 is supported by the two bolts, one at each end (see Figure 10), and by means of the coil spring 44 about the bolts 43, the plate 41 with the spring fingers 42 are inclined to be drawn toward the surface 40 of the frame 38. To adjust the fingers 42, I provide a rod 45 which is threaded in the frame 38 and extends through the surface 40 so as to bear against the plate 41. The upper end of the rod 45 illustrated in Figure 4, is knurled for easy engagement to rotate the same, and by rotating the rod clockwise, the fingers 42 are adjusted down, and by adjusting the same counter-clockwise, the spring fingers are raised toward the surface 40 of the frame 38. This provides an adjustment for the spring finger assembly which permits the fingers 42 to be adjusted quickly if desired toward or away from the meat H, Figure 4.

The spring stripper assembly G may be oscillated during the operation of the machine A so as to facilitate the meat H passing under the knives 16 and to shake off any particles of meat which may cling to the knives 16 or to the bottom of the stripper assembly G. The oscillation of the spring finger stripper is accomplished by the cam 46 positioned on one end of the shaft 15 as illustrated in Figures 2, 10 and 18, and by means of the roller 47 which is carried by one end of the frame 38, together with the spring 48 which is positioned at the other end of the frame 38 and which is adapted to engage the roller 49 under spring tension which holds the roller 47 against the cam 46 under spring tension. The roller 49 is supported by the lever 50 through the slot 51 in the standard frame portion 14, so that when the lever 50 is up in its upper position and is engaged against the shoulder rivet, as illustrated in Figures 4, 5, 14 and 15, the spring stripper finger assembly is held under the spring tension of the spring 48 in engagement with the cam 46. Thus when the shaft 15 is rotated while the spring stripper finger is held in this manner under the tension of the spring 48, the rotation of the shaft 15 will cause the cam 46 to rotate and vibrate or shake the spring finger stripper assembly, oscillating the same, which oscillation is cushioned by the spring 48, and thus the fingers 42 are caused to vibrate from full line position to dotted line position, as illustrated in Figure 4. This oscillation of the spring stripper assembly G is rapid and provides an effective means of keeping the knives 16 of the cutter assembly D clean in their rotation, as well as assisting the meat H in being carried from one position to another on the pallet F, as will be hereinafter set forth, in cutting the meat into small particles, or cubing or dicing the same.

The machine A is provided with a removable shearing bridge bar assembly J which includes the top frame portion 54 from which depend on either side the arms 55 which are adapted to support the crowned shearing bridge bar 56. The bar 56 is attached by suitable screws 57 to the depending arms 55. The bar 56 is formed with a series of arcuated slots 58 which conform to the shape of the cutter discs 16 of the cutter assembly D and in which the cutter blades 16 are adapted to extend, as illustrated in Figures 4, 5 and 10, so as to provide a shearing means with the cutter blades 16 to shear completely through the steak or meat H as it is passed from the pallet F over the crown of the bar 56, whereupon it is deposited back onto the pallet F in the operation of the machine A.

The shearing bridge bar assembly J is removably supported by means of the spring catch members 59 which are operated by the buttons 60 to release the bridge bar assembly from engagement in the notches 61 formed in the sides 14 and 19 of the frame of the machine A.

The bridge bar 56 is adapted to lie in close proximity to the upper surface of the pallet F on which the meat is laid when it is fed into the machine A so that as the meat approaches the thin edge 56' of the shearing bar and the knives 16 are cutting into the same, the meat will be drawn over the bridge bar and simultaneously sheared through, thus cutting the meat in strips which are deposited back onto the pallet F on the other side of the bridge bar 56, and then by running the pallet with the cut strips of meat on it under the bridge bar again, the meat may be cut in cubes or diced into small particles. The first cut is in one direction and the second cut is virtually at right angles thereto or at a transverse angle to the first cut.

The bridge bar 56 is adapted to be held down into operating position by the adjustable screws 62 which bear slightly against the ends of the bar 56 to hold the same in adjusted operating position, as illustrated in Figures 5 and 10. The screws 62 are threaded and adjustable in the frame portions 14 and 19.

The machine A may be used without the shearing bridge bar which is easily removed by releasing the buttons 60, and if it is desired to release the spring stripper assembly from its oscillating position, it is only necessary to lower the lever 50 so that the spring 48 may pass over the roller 49 and the spring stripper assembly moved back into the position illustrated in Figure 6. When the spring stripper assembly is in this position, the roller 49 may be again raised against the end of the spring 48 into the position illustrated in Figure 6, the lever 50 operating the roller into this position and being locked in said position so that the spring stripper bar assembly with the spring fingers 42 are held in backward position and with the roller 47 released from the cam 46 so that the spring stripper assembly G will remain stationary and not oscillate in the operation of the machine A. When the spring stripper assembly is in this stationary position, meat may be sliced by passing the same under the rotary disc knives in an ordinary manner to dice the meat without penetrating through the same. Thus meat may be prepared to tenderize steaks without crushing, but by the draw-cuts of the disc knives, such as 16. While it is not necessary that the stripper assembly G be stationary to cut partly through steaks when the shearing bridge bar assembly J is removed, yet for certain cutting of steaks it is desirable to have the stripper bar assembly G held stationary, whereupon the fingers 42 of the same can be adjusted into the desired position by the adjusting screw 45.

The spring stripper assembly G may also be swung out of operating position with the free ends of the spring fingers 42 moved back away from the working plate 30 so that they can be readily cleaned when it is desired, and also when the cutter assembly D is removed as hereinbefore set forth.

It will be apparent that the cutter assembly D made up of the series of disc knives, such as 16, may be provided with different length spacers 64 so that the knives may be placed farther apart to make wider cuts in the meat, as is illustrated in Figure 10. When the knives are placed farther apart and the bridge bar 56 is used, then the knives will enter say, every other slot 58, and the strips cut will be wider, or the cubes larger. Thus it is apparent that in accordance with the length of the spacer 64 the blades 16 may be set farther apart or closer together. Where the knives 16 are placed close together and the slots 58 are relatively close together, the machine A will slice bacon and other meat into slices by simply passing the same under the knives which is desirable because it gives a uniform thickness to the slices and makes the operation quick and easy to accomplish.

The shearing bridge bar 56 may be removed by means of the screws 57 and replaced by a bridge bar having the slots 58 far apart or close together, if it is desired. The easy removal of my shearing bridge bar assembly permits the same to be thoroughly cleaned and in fact, my entire machine has been designed with the idea of providing the utmost of cleanliness and ease of operation, together with the accomplishment of the different cuts that can be made in meat to provide a very desirable method for the butcher in preparing meat for the customer.

My cutter assembly may be made up of a series of stitching knives 27 instead of the knives 16 and when the cutter assembly is made up in this manner, the blades 27 may be spaced apart the desired width and may be in line or out of line throughout the assembly, being spaced similarly as heretofore described in the assembly D and providing a stitching cutter means which permits pieces of meat to be laid upon the pallet, one upon the other, and passed under the stitching knife assembly with the knives 27, the teeth 28 of these knives penetrating and cutting through at spaced intervals, giving a stitching action which attaches the different pieces or layers of meat together. Thus by the use of the stitching blades, such as 27, instead of the regular cutting discs, different kinds of meat can be stitched together, the meat being tenderized by the cutting through of the teeth 28 which are sharp on the outer peripheral edge in the same manner as the outer peripheral edge of the blades 16 is sharp, so as to cut into the meat rather than to crush or tear it, and permitting heat to enter the cut portions of the meat when it is being cooked or prepared for eating to provide a more tasty, finished steak.

The machine A is provided with a removable cover 65 which is held in place as the guard over the cutting knife assembly D and which may be removed by loosening the screw 66, thus releasing the lug under the cover from the screw 67, as illustrated in Figure 2. The cover 65 protects the operator in using the machine A and carrying out my method of slicing, dicing and cutting meat. The knives 16 may be kept very sharp and rotate rapidly with a clean-cutting action which is very desirable in carrying out my method of shearing the meat to cut it into slices, cubes or small particles by passing the same under the knives any number of times.

A feature of my method and apparatus resides in the fact that the meat to be prepared can be laid on the pallet F and passed under the knives and bridge bar 56, the pallet moving freely, causing the meat to be carried over the crown of the bridge bar and deposited rapidly and evenly, slightly spaced apart, back onto the pallet F, owing to the cuts through the same by the blades, thereby maintaining the relation of the meat on the pallet F even though it has passed over the bridge bar 56. This is important in preparing meat in this manner because otherwise my method of slicing, dicing, cubing or cutting the meat into particles could not be properly carried out.

The pallet F may be made of composition wood, or other suitable material, and is smooth on both sides with the peripheral edge rounded at 68 to permit the same to freely pass under the bridge bar 56. It is desirable that the pallet F be made of composition board of a fairly hard material so that the surface thereof may be kept absolutely clean at all times and to add to the sanitary features of my method and apparatus.

An important feature in carrying out my method resides in the easy and quick removal of the cutter blade assembly which permits me to accomplish the method of preparing meat as herein set forth. The knob 20 with the spring 22 maintains spring tension against the end of the shaft of the cutter assembly D, holding it firmly in place; however, by releasing the knob with a counterclockwise movement and engaging the cutter assembly with the carrier E, the whole cutter assembly is quickly removed and replaced whenever desired. This provides an apparatus which is highly essential in carrying out my method in a simple and effective manner.

If the machine A is tilted or laid on its side, the meat can be dropped into the same under the cutting knives without the movement of the pallet F, the pallet being held stationary under the shearing bridge bar. Thus there is sufficient opening between the knives and the stationary pallet F so that the meat would be drawn by the knives under the same and over the bridge bar, cutting the meat in strips and then if these strips are collected and dropped into the meat to make a transverse cut through the same, the meat can be cut into smaller particles, all of which may be accomplished while the machine is on a slant or lying on its side and without the necessity of having a slidable or movable pallet F. While the machine illustrated here is primarily designed to operate in an upright manner, as illustrated, yet it will be apparent without any additional showing thereof, that the machine could have a slanted table or be operated on its side, as just described, to shear meat as hereinbefore set forth.

I claim:

1. An electrically operated meat-cutting device including an electric motor for operating the same, a series of cutter discs mounted on a common shaft and equally spaced apart, means for removably supporting said shaft with the knives as a unit to permit the unit cutting member to be removed quickly and replaced by another similar cutter, means for locking the cutting unit member in operative position to be rotated by said electric motor, a removable shearing bridge bar, means for holding said bar in close proximity to the cutting edges of said knives of said unit, recesses formed in said cutting bar to correspond with each of said cutting knives of said unit into which said knives are adapted to extend to make a shearing cut, a smooth flat rigid pallet for receiving a slice of meat like a steak, said pallet being adapted to carry the steak of meat to said cutting unit, said bridge bar stripping said meat off of said pallet guiding the meat through said cutter discs, and depositing the cut meat back onto the pallet on the other side of said bridge bar.

2. An electrically operated meat cutting and finishing machine including a removable unitary cutting element consisting of a series of disc-like knives held on a shaft in locked, spaced-apart relation, a work table under said knives, an electric motor for rotating said knives, an adjustable track means associated with said table, a free, smooth pallet upon which meat is adapted to be laid in the cutting operation of the same, said track adjusting means being adapted to be adjusted to move the pallet toward or away from the cutting edges of the knife unit, and means stripping said meat from said pallet and guiding it through said knives, to cut said meat into clean-cut strips and by repeating the cutting operation with the pallet turned to make a transverse cut in relation to the first cut, said last named means guiding the meat to be cut into cubes with a shearing, cutting action of said knives, and depositing the cubes onto the pallet after they are cut by said knives.

3. An electrically operated meat-cubing device including a series of disc-like cutting knives mounted upon a rotatable shaft and secured together as a unit, means for removably supporting said shaft by releasing one end of the same, a shearing bridge bar having a series of knife receiving recesses supported in close proximity to the cutting edges of said knives, a work table spaced below said bridge bar and the bottom of said knives, a spring stripper finger assembly, means for operating said stripper finger assembly, an electric motor for rotating said knives and simultaneously oscillating the said spring stripper assembly through said assembly operating means, and a smooth, free-sliding pallet adapted to carry a slice of meat, like a steak, to said shearing bridge bar, said spring stripper assembly acting to urge movement of the meat as it is being cut by said knives and shearing bar as said stripper assembly oscillates.

4. A power operated meat cutting machine, including a removable work table, a smooth pallet adapted to slide on said work table, track means having anti-friction rollers for supporting said pallet in adjustable relation, a unitary removable cutting means having a series of cutting discs, means for quickly locking said cutting unit means in operative position, also releasing the same, a spring stripper finger assembly adapted to extend between the cutting knives of said unit, a removable bridge bar adapted to provide a shear-cutting means with said cutting knives when in operative position, means for adjusting the free ends of said spring stripper fingers toward or away from said work table, said fingers acting to urge the movement of meat over said bridge bar, and between said cutting knives, means for oscillating said spring stripper finger assembly, and spring means for cushioning the oscillating movement of said spring stripper finger assembly.

5. A meat cutting machine comprising a base, a movable table means operable over said base, a series of rotary cutter discs mounted above said movable table, and a bridge bar above said movable table including notches for accommodating the edges of said discs, means supporting said bar beyond the center of said cutter discs in the path of movement, whereby said discs engage the meat gradually while on said table and complete the cut while on said bar.

6. A meat cutting machine comprising a base, a flat pallet slidable over said base, a rotatable cutter unit including a series of spaced rotatable discs mounted for rotation above the path of movement of said movable pallet, a bridge bar beneath which said pallet is designed to extend having notches therein to accommodate the discs of said cutter unit, said bridge bar being located past the center of said discs in the direction of movement of said pallet to engage the meat on said pallet after the meat has been partially cut and to extend between the meat and the pallet.

7. A meat cutting machine comprising a table, a flat rigid pallet movable over said table, a series of cutter discs in spaced relation mounted for rotation above said pallet, a bridge bar having notches therein to accommodate an edge of each of said cutter discs above the level of said pallet, a pair of arms supporting said bridge bar, means connecting said arms to hold the same in spaced relationship, and means secured to said table detachably supporting said arms to hold said bridge bar in operative relation to said cutter discs and said table.

8. A meat cutting machine comprising a base, a table mounted upon said base, a series of spaced cutter discs mounted for rotation above said table, a shaft upon which said discs are mounted, and supports on said shafts extending upwardly from said base, a bridge bar containing notches in which said discs are designed to extend, a pair of arms supporting said bridge bar, means connecting said arms to hold the same in proper spaced relationship, and means detachably connecting said arms to said end supports to hold said bridge bar in operative relation with said discs and said table.

9. A meat cutting machine including a base, a table on said base, a series of spaced discs mounted for rotation above said table, a bracket pivotally secured to said base, a series of spring fingers mounted on said bracket, and cam means rotatable with said discs and engageable with said bracket to cause oscillation of said bracket and spring fingers mounted thereupon.

10. An electrically operated machine for cutting meat with a shearing cut to form it into equal width strips and cubes, including disc-like electrically operated cutter blades, a table spaced from said blades, a bridge bar into which said cutter blades extend, said bridge bar being spaced from said table, and a rigid pallet slidable beneath said bridge for forwarding the meat through said cutter blades and over said bridge bar, to make a clean shearing cut without crushing the meat.

11. A meat cutting machine including cutter means for cutting meat with a shearing cut, first into strip-like form and by a second cut into cube form, stripper means movable into and out of operative position and extending between said cutter means, means for oscillating said stripper means, means for adjusting said stripper means, means for releasing said stripper means to swing out of operating position, a flat rigid meat supporting pallet, means for removably supporting said cutter means in a unit to permit a different unit to be quickly inserted in place of said cutter unit, a shearing bridge bar means into which said cutter means extends, said bridge bar acting to strip the meat from said pallet when it is being sheared.

12. A meat cutting device including unitary quickly replaceable cutting means, including spaced cutting knives, stripper means adapted to extend between the cutting knives of said cutter means to act above the meat being cut thereby, a pallet for supporting meat, said pallet having a flat rigid body, stripper means held in close proximity to said cutting knives to engage the under surface of the meat between said pallet and said meat to strip the same from said supporting pallet when the meat is being cut, whereby said cutting device will automatically cut meat or the like into strips or small particles.

ALDRICH L. JACKSON.